United States Patent
Teoman et al.

(10) Patent No.: US 6,649,863 B2
(45) Date of Patent: Nov. 18, 2003

(54) GEMSTONE MARKING SYSTEM WITH A FOCUS SENSING UNIT FOR SENSING RELATIVE DISPOSITION BETWEEN A MARKING SURFACE OF THE GEMSTONE AND A FOCAL PLANE OF A LASER BEAM

(75) Inventors: Emre Teoman, Columbia, MD (US); Thomas Hubin, Laurel, MD (US)

(73) Assignee: Potomac Photonics, Inc., Lanham, MD (US)

( * ) Notice: Subject to any disclaimer, the term of this patent is extended or adjusted under 35 U.S.C. 154(b) by 110 days.

(21) Appl. No.: 10/045,167

(22) Filed: Jan. 15, 2002

(65) Prior Publication Data

US 2002/0134769 A1 Sep. 26, 2002

Related U.S. Application Data

(60) Provisional application No. 60/261,211, filed on Jan. 16, 2001.

(51) Int. Cl.[7] ............................ B23K 26/06; B23K 26/38
(52) U.S. Cl. ............................ 219/121.68; 219/121.69; 219/121.82; 219/121.83; 356/123
(58) Field of Search .................. 219/121.82, 121.83, 219/121.68, 121.69; 250/201.2; 356/122, 123

(56) References Cited

U.S. PATENT DOCUMENTS

| | | | | |
|---|---|---|---|---|
| 4,472,055 A | * | 9/1984 | Tsutsumi | ..................... 356/123 |
| 5,521,374 A | * | 5/1996 | Cray et al. | ............. 219/121.83 |
| 6,151,109 A | * | 11/2000 | Bromssen et al. | ..... 219/121.83 |
| 6,476,351 B1 | * | 11/2002 | Kaplan et al. | ......... 219/121.83 |
| 2003/0038121 A1 | * | 2/2003 | Christensen | |
| 2003/0071021 A1 | * | 4/2003 | Benjano | ................. 219/121.82 |

FOREIGN PATENT DOCUMENTS

| | | | | |
|---|---|---|---|---|
| JP | | 5-23880 A | * | 2/1993 |
| JP | | 10-230381 A | * | 9/1998 |

* cited by examiner

*Primary Examiner*—Geoffrey S. Evans
(74) *Attorney, Agent, or Firm*—Rosenberg, Klein & Lee

(57) ABSTRACT

A gemstone marking system includes a focus sensing unit sensing relative disposition between the marking surface of the gemstone and the focal plane of the laser beam. The focus sensing unit includes a light source emitting a collimated optical beam directed in parallel to the focal plane of the laser beam and overlapping regions positioned in close proximity to the focal plane of the laser beam, an optical detector measuring the power of the sensing optical beam (the power of the sensing optical beam depends on a relative disposition between the marking surface of the gemstone and the focal plane of the laser beam), and a signal processing unit operationally coupled to the output of the optical detector for receiving and processing data corresponding to the relative disposition of the marking surface of the gemstone and the focal plane of the laser beam. The signal processing unit, in response to the data obtained from the optical detector, automatically controls the position of the gemstone.

11 Claims, 2 Drawing Sheets

GEMSTONE MARKING SYSTEM WITH A FOCUS SENSING UNIT FOR SENSING RELATIVE DISPOSITION BETWEEN A MARKING SURFACE OF THE GEMSTONE AND A FOCAL PLANE OF A LASER BEAM

The subject utility patent application is based upon a provisional application No. 60/261,211 filed Jan. 16, 2001.

FIELD OF INVENTION

The present invention relates to a gemstone marking system; and more particularly, to a focus sensing means in a gemstone marking system for sensing relative disposition between a marking surface of the gemstone and a focal plane of a laser beam and for adjusting the relative disposition therebetween when needed.

BACKGROUND OF THE INVENTION

Laser marking systems for inscribing indicia on gemstones defined for the purposes of this invention to include diamonds, pearls, semiprecious and precious gemstones have been described in U.S. Pat. Nos. 4,392,476; 5,932,119; and 4,467,172. These gemstone marking systems utilize energy from pulsed lasers to ablate or vaporize material from the girdle or one or more facets of the polished gemstone as the gemstone is moved under a focused laser beam.

To inscribe complex indicia on the marking surface of gemstones, the systems described in the U.S. Pat. Nos. 5,410,125 and 5,573,684 employ the projection of patterns defined by masks placed between an ultraviolet excimer laser and the surface of a gemstone as a mechanism for production of identifying marks.

In the laser marking systems, the gemstone surface is to be positioned within a few tens of microns of a specific focal plane (also known as an image plane) of the laser beam. In some prior art systems, for example those described in U.S. Pat. Nos. 4,392,476 and 5,932,119, magnifying optics are used to view the edge of the gemstone, so that an operator can position the marking surface in close proximity to the focal plane. There magnification systems often require significant operator intervention to move the gemstone to the focal (or imaging) plane of the laser beam. The need for operator involvement increases the time required for marking of the gemstone and may introduce a potential for a human operator error that may result in damage or loss in value of the gemstone.

It is highly desirable to avoid the involvement of operator from the process of gemstone marking and to accomplish the proper positioning of the gemstone marking surface in the focal plane of the laser beam automatically.

SUMMARY OF THE INVENTION

It is, therefore, an object of the present invention to provide a gemstone marking system having a mechanism for automatically determining the position of the desired marking gemstone surface with relation to the focal (or image) plane of the laser beam.

It is another object of the present invention to provide a focus sensing unit in a gemstone marking system which senses the distance of a gemstone marking surface from the focal plane of the laser beam and which outputs electrical signals indicative of such a displacement of the marking surface from the focal plane.

It is still a further object of the present invention to provide a gemstone marking system with a focus sensing unit which permits automatic positioning of a gemstone surface at the focal (or image) plane of the laser beam with minimal or without operator intervention in the process.

According to the teachings of the present invention, a gemstone marking system includes a laser generating a laser beam directed to a marking surface of the gemstone and a focused sensing unit for sensing relative disposition between the marking surface of the gemstone and the focal plane of the laser beam.

The focus sensing unit includes:

(A) A light source, emitting a collimated optical beam directed substantially in coinciding fashion with the focal plane of the laser beam, and overlapping regions positioned in close proximity to the focal plane, and (B) an optical detector measuring the power of the optical beam, wherein the power of the optical beam depends on the relative disposition between the marking surface of the gemstone and the focal plane.

In addition to the light source and the optical detector the focus sensing unit includes a signal processing unit operationally coupled to the output of the optical detector for receiving data therefrom and processing the data corresponding to the relative disposition of the marking surface of the gemstone and the focal plane of the laser beam.

Preferably, the signal processing unit is operationally coupled to the translating stage to which the gemstone is mounted, for automatically controlling the position of the gemstone in response to the data received from the optical detector.

Optionally, the gemstone marking system may include a display coupled to the signal processing unit for displaying the data obtained from the focused sensing unit in order that a human operator may use the displayed output data to relocate the gemstone.

Viewing another aspect of the invention, there is presented a method for marking gemstones, including the steps of:

generating the laser beam and directing the laser beam towards a marking surface of gemstone;

generating the collimated sensing optical beam and directing the sensing optical beam substantially coincidentally with a focal plane of the laser beam, in order that the sensing optical beam overlaps regions positioned in close proximity to the focal plane of the laser beam, measuring the power of the sensing optical beam which is dependent on a relative disposition between said marking surface of the gemstone and the focal plane of the laser beam, processing data corresponding to the measured power of the sensing optical beam, and changing the position of the gemstone to the focal plane of the laser beam in response to processed data.

In the method of the present invention for marking gemstones, the processed data may be used either for automatically changing of the position of the gemstone or can be displayed in order that human operator may use the data to change the position of the gemstone.

This and other features and advantages of the present invention will be understood in conjunction with the drawings and the description of the preferred embodiment of the present invention.

PREFERRED EMBODIMENT OF THE PRESENT INVENTION

Figure 1:
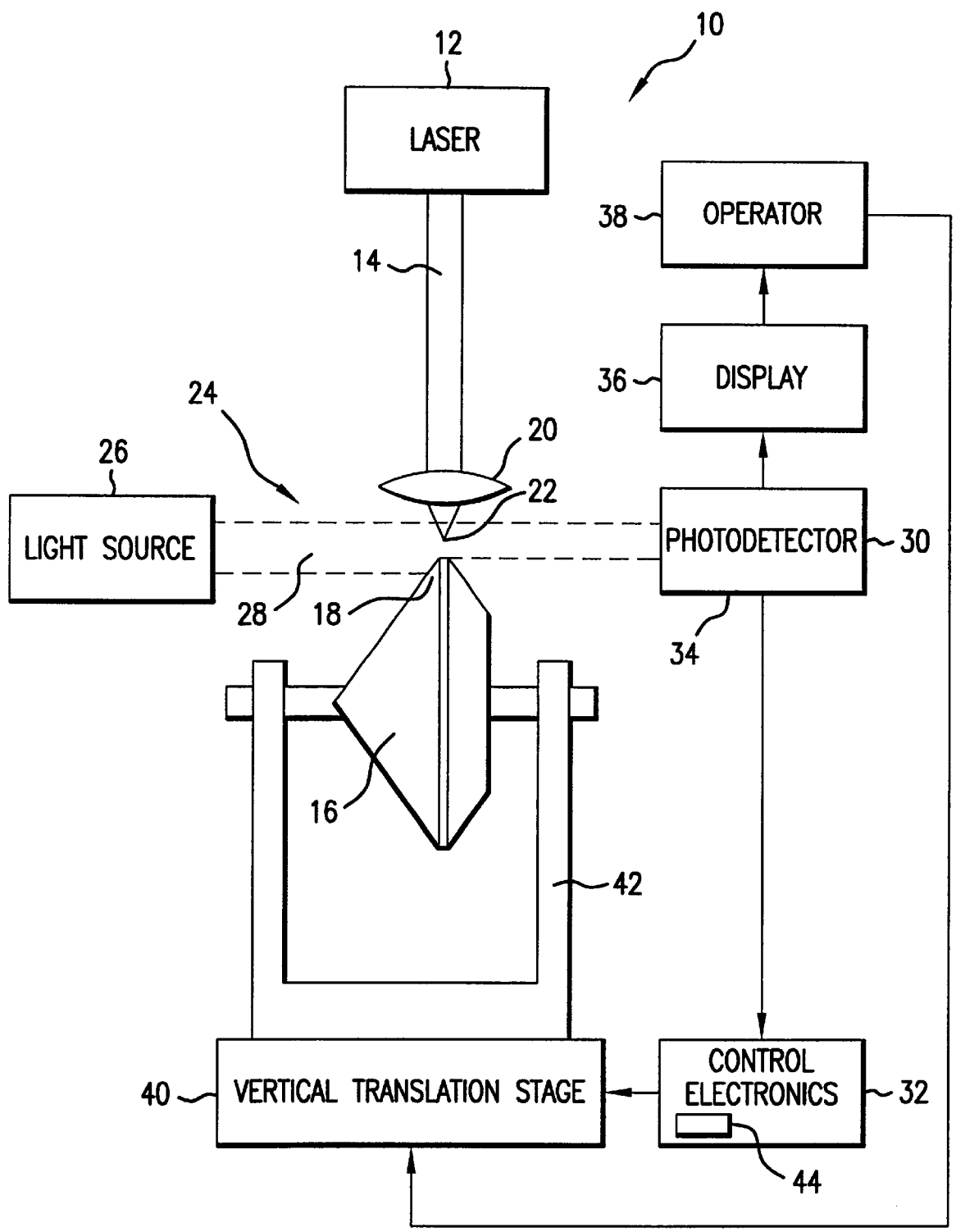
FIG. 1 is a schematic representation of a gemstone marking system of the present invention.

Referring to FIG. 1, a gemstone marking system 10 includes a laser source 12, which is preferably pulsed multi-mode excimer laser capable of generating a laser beam 14, directed towards a gemstone 16 having a marking surface 18. An optic system 20, which includes focusing lenses is positioned a predetermined distance from the marking surface 18 to provide a highly focused laser beam incident unto the marking surface 18. In order to obtain high quality inscription of the predetermined pattern (marks, character or characters, logo) on the marking surface of the gemstone, the gemstone marking surface 18 is positioned within a few micron tenths off a focal plane (or image plane) of the laser beam 14. Displacement of the marking surface from the focal plane 22 of more than that amount will deteriorate the quality of the marking process and therefore is avoided.

In order to sense the relative disposition between the marking surface 18 of the gemstone 16 and the focal plane 22 of the laser beam 14, a focused sensing unit 24 is included into the gemstone marking system 10 of the present invention. The focus sensing unit 24 includes a light source 26 of collimated optic beam 28 (which will be also referred herein as a sensing beam), a photodetector 30 receiving the sensing beam and a signal processing unit (or a control electronics) 32 coupled to the output 34 of the photodetector 30. The light source 26 emits the optical sensing beam 28 which extends substantially in parallel to the focal plane 22 and overlaps regions positioned in close proximity to the focal plane of the laser beam, i.e. the sensing beam 28 extends both above and below the focal plane and passes through the region of the focal plane in which marking occurs.

The gemstone marking is normally conducted initially by orienting the gemstone 16 such that the marking surface 18 is located uppermost and is substantially parallel to the focal plane 22 of the laser beam 14. When the gemstone 16 is oriented in this manner and is positioned near the focal plane 22 of the laser it intercepts a portion of the sensing beam 28 and reduces the output signal produced by the photodetector 30 positioned in the path of the sensing beam 28. The photodetector output 34 varies directly with the vertical distance from the gemstone marking surface 18 to the focal plane of the laser of the marking system 10.

The photo-detector output signal received by the control electronics unit 32, may be displayed on the display 36, for being used by a human operator 38 to locate the marking surface 18 as the focal plane of the system.

However, be in the preferred embodiment, the photo-detector output signal is delivered to the control electronics unit 32, that processes the data corresponding to the displacement the marking surface of the gemstone and the focal plane of the laser beam, and automatically adjusts the position of the vertical translation stage 40 to which the gemstone is mounted by means of the gemstone fixture 42, in order to position the gemstone marking surface 18 exactly at, or in close proximity (within a few micron tenths) to the focal plane 22 of the marking system 10.

The control electronics unit 32 includes software 44 which controls the process of automatic adjustment of the position of the gemstone 16 with respect to the focal plane 22 of the laser beam 14.

Figure 2:
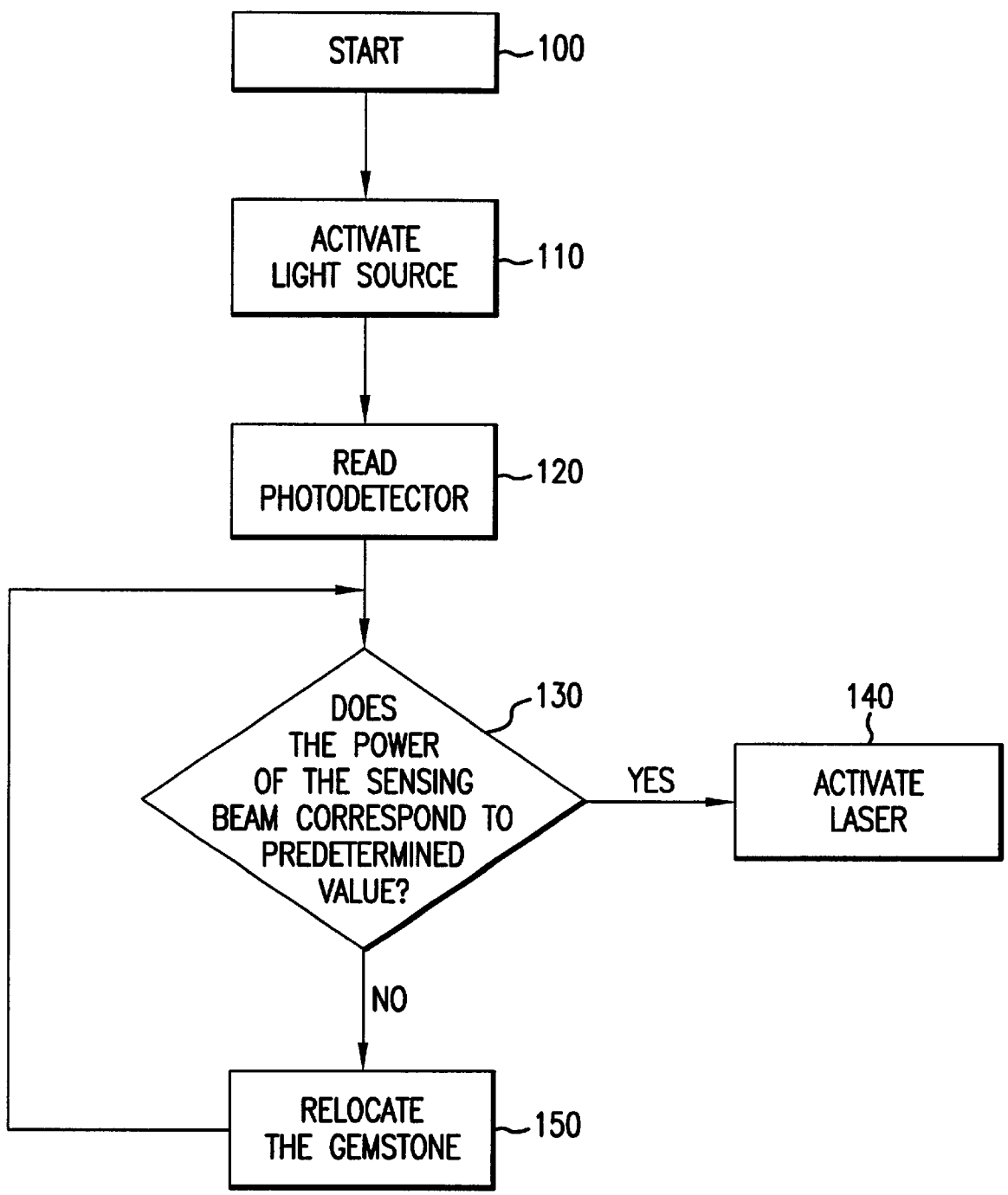
FIG. 2 is a flowchart diagram of the focus sensing process of the present invention.

Referring to FIG. 2, the procedure of sensing the location of the gemstone 16 with regard to the focal plane 22 starts in block 100 "Start", from where the logic flows to the block 110 "Activate Light Source", where the light source 26 is activated to generate a collimated sensing beam 28, which is directed substantially in parallel to the focal plane 22 of the system and which is incident onto the photodetector 30.

From the block 110, the flowchart moves to the block 120 "Read Photodetector", in which the photodetector measures the power of the received sensing beam 28 and outputs the data corresponding to the measured power (as well as to the distance between the marking surface 18 and focal plane 22) to the control electronic unit 32. The control electronic unit 32 includes a set of predetermined data to which the data corresponding to measured power of the sensing beam 28 is compared.

The flowchart moves from the block 120 to block 130 "Does the Power of the Sensing Beam Corresponds to the Predetermined Values", where the measured data are compared with the preset values.

If the power corresponds to the predetermined values, meaning that the marking surface 18 is positioned at an optimal focal plane 22, as required by the marking process, the logic moves to the block 140 "Activate Laser", so that the laser beam can evaporate particles of material of the gemstone to create a required marking on the marking surface thereof. If, however, the power of the sensing beam, in block 130, does not correspond to the predetermined values, the logic flows to the block 150 "Relocate the Gemstone", wherein the control electronics unit 32 automatically changes the position of the vertical translation stage 40, in order to bring the marking surface 18 as close to the focal plane 22 as possible. When such an action is performed, the logic moves from the block 150 to the block 130 in order to compare newly obtained data related to the relative disposition of the marking surface 18 and the focal plane 22 to the set of the predetermined values preset in the control electronic unit 32.

Although the present invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit of scope of the invention as defined in the appended claim.

What is claimed is:

1. A gemstone marking system, comprising:
    (a) a laser, said laser generating a laser beam having a focal plane and directed to a marking surface of a gemstone;
    (b) means for translating the gemstone relative to said focal plane of said laser beam;
    (c) a focus sensing unit sensing relative disposition between said marking surface of the gemstone and said focal plane of said laser beam, said focus sensing unit including:
    a light source emitting a collimated optical beam directed in substantially coinciding fashion with said focal plane of said laser beam and overlapping regions positioned in close proximity to said focal plane of said laser beam, and an optical detector measuring the power of said optical beam, the power of said optical beam depending on a relative disposition between said marking surface of the gemstone and said focal plane of said laser beam; and
    (d) a signal processing unit operationally coupled to an output of said optical detector for receiving therefrom and processing data corresponding to the relative disposition of said marking surface of the gemstone and said focal plane of said laser beam.

2. The gemstone marking system of claim 1, wherein said signal processing unit is operationally coupled to said translating means to automatically control the position of the gemstone in response to said data received from said optical detector.

3. The gemstone marking system of claim 1, further comprising a display coupled to said signal processing unit for displaying said data obtained from said focus sensing unit.

4. The gemstone marking system of claim 1, wherein said translating means include a precision translation stage for moving the gemstone substantially in parallel with said laser beam.

5. The gemstone marking system of claim 4, further comprising a gemstone fixture for mounting the gemstone on said precision translation stage.

6. A focus sensing unit in a gemstone marking system for sensing relative disposition between a marking surface of the gemstone and a focal plane of a laser beam incident to said marking surface, said focus sensing unit comprising:

(a) a light source emitting a collimated optical beam directed in substantially coinciding fashion with said focal plane of the laser beam and overlapping regions positioned in close proximity to said focal plane of said laser beam, (b) an optical detector coupled to said optical beam and measuring the power thereof, the power of said optical beam depending on a relative disposition between said marking surface of the gemstone and said focal plane of said laser beam, and (c) a signal processing unit coupled to said optical detector for receiving therefrom and processing data corresponding to the relative disposition of said marking surface of the gemstone and said focal plane of said laser beam.

7. The focus sensing unit of claim 6, wherein said signal processing unit controls the position of the gemstone in response to said data.

8. The focus sensing unit of claim 6, wherein said signal processing unit outputs said data to be used by a human operator for relocating the gemstone.

9. A method for marking gemstones, comprising the steps of:

(a) generating a laser beam and directing said laser beam towards a marking surface of a gemstone;

(b) generating a collimated sensing optical beam and directing said sensing optical beam substantial coincidentally with a focal plane of said laser beam, said sensing optical beam overlapping regions positioned in close proximity to said focal plane of said laser beam;

(c) measuring the power of said sensing optical beam, the power of said sensing optical beam depending on a relative disposition between said marking surface of the gemstone and said focal plane of said laser beam;

(d) processing data corresponding to the measured power of said sensing optical beam; and (e) changing position of the gemstone substantially to said focal plane of said laser beam in response to said processed data.

10. The method of claim 9, further comprising the step of displaying said processed data for a human operator to change the position of the gemstone.

11. The method of claim 9, wherein said changing of the position of the gemstone is performed automatically.

* * * * *